United States Patent
Duan et al.

(10) Patent No.: US 12,222,796 B2
(45) Date of Patent: Feb. 11, 2025

(54) CONTROL METHOD AND SYSTEM FOR POWER CONSUMPTION UPPER LIMIT OF SERVER, AND RELATED COMPONENT

(71) Applicant: SHANDONG YINGXIN COMPUTER TECHNOLOGIES CO., LTD., Shandong (CN)

(72) Inventors: Yihai Duan, Shandong (CN); Fan Shao, Shandong (CN)

(73) Assignee: SHANDONG YINGXIN COMPUTER TECHNOLOGIES CO., LTD., Shandong (CN)

( * ) Notice: Subject to any disclaimer, the term of this patent is extended or adjusted under 35 U.S.C. 154(b) by 134 days.

(21) Appl. No.: 18/008,398

(22) PCT Filed: Feb. 23, 2021

(86) PCT No.: PCT/CN2021/077382
§ 371 (c)(1),
(2) Date: Dec. 5, 2022

(87) PCT Pub. No.: WO2022/021866
PCT Pub. Date: Feb. 3, 2022

(65) Prior Publication Data
US 2023/0288980 A1    Sep. 14, 2023

(30) Foreign Application Priority Data
Jul. 28, 2020 (CN) .......................... 202010740275.4

(51) Int. Cl.
*G06F 1/3296* (2019.01)
(52) U.S. Cl.
CPC ................................. *G06F 1/3296* (2013.01)
(58) Field of Classification Search
CPC ........ G06F 1/3206; G06F 1/28; G06F 1/3296; G06F 11/30
See application file for complete search history.

(56) References Cited

U.S. PATENT DOCUMENTS

| | | | | |
|---|---|---|---|---|
| 2007/0186121 A1* | 8/2007 | Yasuo | .................... | G06F 1/3203 713/320 |
| 2011/0320795 A1* | 12/2011 | Bosisio | ................. | G06F 1/3287 713/1 |

(Continued)

FOREIGN PATENT DOCUMENTS

| | | |
|---|---|---|
| CN | 103902016 A | 7/2014 |
| CN | 104460942 A | 3/2015 |

(Continued)

OTHER PUBLICATIONS

Corresponding PCT Application No. PCT/CN2021/077382, International Search Report dated May 26, 2021.

(Continued)

*Primary Examiner* — Nimesh G Patel
(74) *Attorney, Agent, or Firm* — Cooper Legal Group, LLC

(57) ABSTRACT

A control method, system and device for a power consumption upper limit of a server, and a readable storage medium, includes: determining, according to a server policy, a power consumption upper limit of a management engine (ME) to be a first expected upper limit; acquiring actual power consumption of a server; comparing the current actual power consumption with the first expected upper limit and a second expected upper limit; and if the current actual power consumption is greater than the first expected upper limit and does not exceed the second expected upper limit, lowering a current power consumption upper limit until the current actual power consumption is lowered such that same does not exceed the first expected upper limit.

14 Claims, 2 Drawing Sheets

(56) References Cited

U.S. PATENT DOCUMENTS

| 2015/0200544 | A1* | 7/2015 | Kitaji | H02J 13/00028 |
| | | | | 700/295 |
| 2016/0154455 | A1* | 6/2016 | Kawabe | G06F 1/324 |
| | | | | 713/320 |
| 2020/0159303 | A1* | 5/2020 | Van Cleve | G06F 1/3243 |

FOREIGN PATENT DOCUMENTS

| CN | 104572402 A | 4/2015 |
| CN | 105786152 A | 7/2016 |
| CN | 108121638 A | 6/2018 |
| CN | 108983946 A | 12/2018 |
| CN | 111949478 A | 11/2020 |

OTHER PUBLICATIONS

Corresponding PCT Application No. PCT/CN2021/077382, Written Opinion dated May 26, 2021.

Corresponding Chinese Patent Application No. 202010740275.4, Notification to Grant Patent Right for Invention, dated Feb. 25, 2022.

Song Liu et al., "Power Capping Control for Cluster System Based on RAPL", Computer Engineering, May 2017, pp. 40-46, vol. 43, No. 5. Full text with English abstract.

Chen, et al., "Dynamic server power capping for enabling data center participation in power markets", 2013 IEEE/ACM International Conference on Computer-Aided Design (ICCAD), Nov. 18, 2013, pp. 122-129.

* cited by examiner

CONTROL METHOD AND SYSTEM FOR POWER CONSUMPTION UPPER LIMIT OF SERVER, AND RELATED COMPONENT

This application claims priority to Chinese Patent Application No. CN202010740275.4, filed on Jul. 28, 2020 in China National Intellectual Property Administration and entitled "Control Method and System for Power Consumption Upper Limit of Server, and Related Component", the contents of which are hereby incorporated by reference in its entirety.

FIELD

The present application relates to the field of control of power consumption of servers, in particular, to a control method and system for a power consumption upper limit of a server, and a related component.

BACKGROUND

As the scale of new data centers becomes larger, the power consumption also increases, and the power consumption management of a primary server becomes more and more important. At present, a server power consumption control flow in a computer room includes: An Intel's intelligent power node provides s power consumption control policy and sends it to a management engine (ME). The policy includes a policy scope, a policy identification (ID), a policy triggering method, a policy abnormality handling, a power consumption upper limit set by the policy, and the like. After receiving the set power consumption control policy, the ME mainly lowers the overall power consumption of the server by means of adjusting the running time or frequency of a central processing unit (CPU).

However, the power consumption upper limit in the power consumption control policy is usually a constant value, indicating the maximum power consumption that the policy allows the server to run. However, in a complex application environment, an ME will have errors in adjustment due to different types of servers and different loads on the various servers. The power consumption of the server cannot be lowered to an expected upper limit of power consumption and cannot meet a final power consumption control requirement.

Therefore, how to provide a solution for the above technical problems is a problem that those skilled in the art have to solve at present.

SUMMARY

In view of this, the present disclosure aims to provide a method and system for controlling a power consumption upper limit of a server, and a related component, so as to achieve accurate control of the power consumption of the server in various kinds of complicated application scenarios. The specific solution is as follows:

A control method for a power consumption upper limit of a server includes:
  determining, according to a server policy, a power consumption upper limit of a management engine (ME) to be a first expected upper limit;
  acquiring actual power consumption of a server;
  comparing the current actual power consumption with the first expected upper limit and a second expected upper limit; and
  if the current actual power consumption is greater than the first expected upper limit and does not exceed the second expected upper limit, lowering the current power consumption upper limit until the current actual power consumption is lowered such that same does not exceed the first expected upper limit.

In some embodiments, the process of lowering the current power consumption upper limit until the current actual power consumption is lowered such that same does not exceed the first expected upper limit includes:
  lowering and updating the current power consumption upper limit according to the current actual power consumption, the current power consumption upper limit, the first expected upper limit and the second expected upper limit until the current actual power consumption is lowered such that same does not exceed the first expected upper limit.

In some embodiments, the process of lowering and updating the current power consumption upper limit according to the current actual power consumption, the current power consumption upper limit, the first expected upper limit and the second expected upper limit includes:
  updating the current power consumption upper limit of the ME according to a lowering formula, the lowering formula including:

$$a_{n+1}=a_n-e_{n+1}, e_{n+1}=s(x_n-a_n)+(1-s)e_n, n=1,2,\ldots;$$

where $x_n$ is the current actual power consumption; $a_n$ is the current power consumption upper limit; $a_1$ is valued as the first expected upper limit; $e_n$ is a current allowable error interval value; $e_1$ is valued as a difference value between the second expected upper limit and the first expected upper limit; and s is a correction coefficient.

In some embodiments, the correction coefficient is greater than 0.5.

In some embodiments, the control method further includes:
  if the current actual power consumption exceeds the second expected upper limit, determining that power consumption limitation of the ME fails.

In some embodiments, the process of determining a power consumption upper limit of an ME to be a first expected upper limit includes:
  determining, according to the server policy, the power consumption upper limit of the ME to be the first expected upper limit through an intelligent platform management interface (IPMI) command.

In some embodiments, the process: if the current actual power consumption is greater than the first expected upper limit and does not exceed the second expected upper limit, lowering the current power consumption upper limit until the current actual power consumption is lowered such that same does not exceed the first expected upper limit, includes:
  if the current actual power consumption is greater than the first expected upper limit and does not exceed the second expected upper limit, lowering the current power consumption upper limit through the IPMI command until the current actual power consumption is lowered such that same does not exceed the first expected upper limit.

Correspondingly, the present disclosure further discloses a control system for a power consumption upper limit of a server, including:

an upper limit determining module, configured to determine, according to a server policy, a power consumption upper limit of an ME to be a first expected upper limit;
an actual power consumption acquisition module, configured to acquire actual power consumption of a server; and
a comparison module, configured to compare the current actual power consumption with the first expected upper limit and a second expected upper limit,
wherein the upper limit determining module is also configured to: if the current actual power consumption is greater than the first expected upper limit and does not exceed the second expected upper limit, lower the current power consumption upper limit until the current actual power consumption is lowered such that same does not exceed the first expected upper limit.

Correspondingly, the present disclosure further discloses a control device for a power consumption upper limit of a server, including:
a memory, configured to store a computer program; and
a processor, configured to execute the computer program to implement the steps of any control method for a power consumption upper limit of a server.

Correspondingly, the present disclosure further discloses a readable storage medium. The readable storage medium stores a computer program; and the computer program is executed by a processor to implement the steps in any control method for a power consumption upper limit of a server.

The present disclosure discloses a control method for a power consumption upper limit of a server, including: determining, according to a server policy, a power consumption upper limit of an ME to be a first expected upper limit; acquiring actual power consumption of a server; comparing the current actual power consumption with the first expected upper limit and a second expected upper limit; and if the current actual power consumption is greater than the first expected upper limit and does not exceed the second expected upper limit, lowering the current power consumption upper limit until the current actual power consumption is lowered such that same does not exceed the first expected upper limit. In the present disclosure, the effect of power consumption adjustment of an ME is reflected on the actual power consumption of a server, and a power consumption upper limit of the ME is subjected to dynamic negative feedback adjustment by utilizing the actual power consumption, until the actual power consumption is lowered to the first expected upper limit, whereby the power consumption control requirement of the server policy is met.

DETAILED DESCRIPTION

The technical solutions in this application will be described clearly and completely below with reference to the drawings of the specification in the present application. The embodiments described are part of the embodiments of the present application, not all the embodiments. Based on the embodiments in the present application, all other embodiments obtained by those of ordinary skill in the art without creative work all fall within the protection scope of the present application.

Embodiment I

A power consumption upper limit in a power consumption control policy in the prior art is usually a constant value, indicating the maximum power consumption that the policy allows a server to run. However, in a complex application environment, an ME will have errors in adjustment due to different types of servers and different loads on the various servers. The power consumption of the server cannot be lowered to an expected upper limit of power consumption and cannot meet a final power consumption control requirement. In the present disclosure, the effect of power consumption adjustment of an ME is reflected on the actual power consumption of a server, and a power consumption upper limit of the ME is subjected to dynamic negative feedback adjustment by utilizing the actual power consumption, until the actual power consumption is lowered to the first expected upper limit, whereby the power consumption control requirement of the server policy is met.

Figure 1:
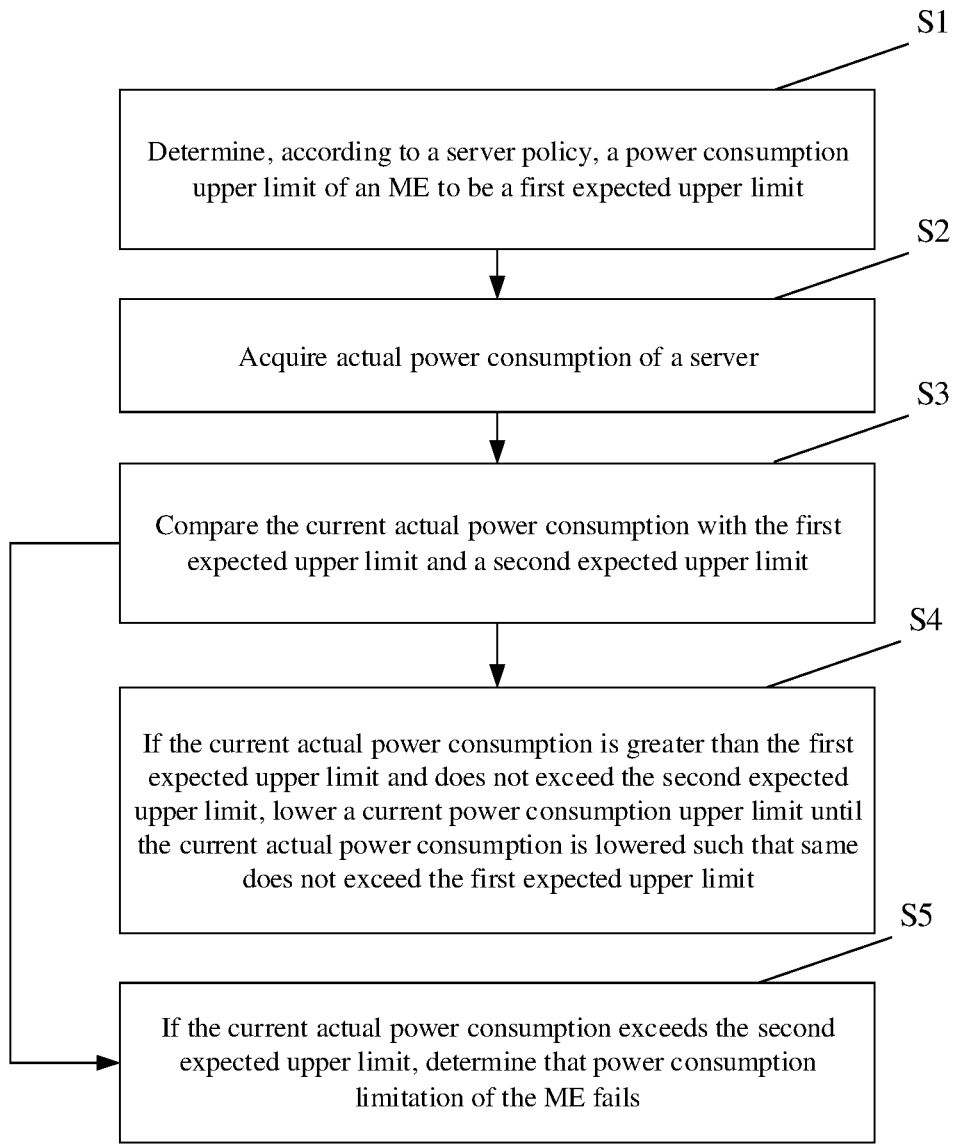
FIG. 1 is a flowchart of steps of a control method for a power consumption upper limit of a server in an embodiment of the present disclosure.

An embodiment of the present disclosure discloses a control method for a power consumption upper limit of a server, referring to FIG. 1, including the following steps.

In S1, according to a server policy, a power consumption upper limit of an ME is determined to be a first expected upper limit.

In some embodiments, the power consumption upper limit of the ME is determined, according to the server policy, to be the first expected upper limit through an IPMI command.

In S2, actual power consumption of a server is acquired.

In S3, the current actual power consumption is compared with the first expected upper limit and a second expected upper limit.

It might be understood that if the current actual power consumption does not exceed the first expected upper limit, it indicates that power consumption limitation of the ME succeeds, and the power consumption upper limit of the ME will be no longer adjusted.

If the current actual power consumption exceeds the first expected upper limit, an excess needs to be calculated, whereby whether this situation is an adjustment error or an out-of-control adjustment is determined according to the excess. This step is determined by means of the second expected upper limit. Usually, an adjustment error that the system allows is small, which generally does not exceed 5% of the first expected upper limit, that is, the second expected upper limit is usually a power value less than 105% of the first expected upper limit. Once the current actual power consumption exceeds the adjustment error, it is determined that the adjustment is out of control and the power consumption limitation fails.

In S4, if the current actual power consumption is greater than the first expected upper limit and does not exceed the second expected upper limit, the current power consumption upper limit is lowered until the current actual power consumption is lowered such that same does not exceed the first expected upper limit.

In some embodiments, if the current actual power consumption is greater than the first expected upper limit and does not exceed the second expected upper limit, the current power consumption upper limit is lowered through an IPMI command until the current actual power consumption is lowered such that same does not exceed the first expected upper limit.

It might be understood that after receiving the IPMI command of the server policy, ME performs the power consumption limitation according to the first expected upper limit serving as a power consumption upper limit. If the current actual power consumption is between the first expected upper limit and the second expected upper limit in the power consumption limitation process, it indicates that there is an error in the power consumption limitation of the ME. In this embodiment, in the power consumption limitation process of the ME, the actual power consumption might be lowered by means of lowering the current power consumption upper limit, whereby the actual power consumption is lowered from an interval that is greater than the first expected upper limit to the first expected upper limit or to a position less than the first expected upper limit.

Further, the control method further includes the following step:

S5: if the current actual power consumption exceeds the second expected upper limit, it is determined that power consumption limitation of the ME fails.

It might be understood that after the power consumption upper limit of the same ME is controlled for many times, a correspondence relationship between the actual power consumption of the server in the historical data and the power consumption upper limit of the ME might be determined according to numerical values of the actual power consumption of the server in the historical data and the power consumption upper limit of the ME through machine learning, a neural network and other methods, and then the correspondence relationship is directly used in the subsequent power consumption limitation of the ME. In order to limit the actual power consumption to the first expected upper limit, the power consumption upper limit of the current actual power consumption of the ME in the correspondence relationship, whereby the ME might perform the power consumption limitation according to the power consumption upper limit, thus achieving the objective that the actual power consumption of the server does not exceed the first expected upper limit.

The present disclosure discloses a control method for a power consumption upper limit of a server, including: determining, according to a server policy, a power consumption upper limit of an ME to be a first expected upper limit; acquiring actual power consumption of a server; comparing the current actual power consumption with the first expected upper limit and a second expected upper limit; and if the current actual power consumption is greater than the first expected upper limit and does not exceed the second expected upper limit, lowering the current power consumption upper limit until the current actual power consumption is lowered such that same does not exceed the first expected upper limit. In the present disclosure, the effect of power consumption adjustment of an ME is reflected on the actual power consumption of a server, and a power consumption upper limit of the ME is subjected to dynamic negative feedback adjustment by utilizing the actual power consumption, until the actual power consumption is lowered to the first expected upper limit, whereby the power consumption control requirement of the server policy is met.

Embodiment II

An embodiment of the present disclosure discloses a control method for a power consumption upper limit of a server. Compared with the above embodiment, this embodiment further describes and optimizes the technical solution. In some embodiments, the process of lowering the current power consumption upper limit until the current actual power consumption is lowered such that same does not exceed the first expected upper limit includes:

lowering and updating the current power consumption upper limit according to the current actual power consumption, the current power consumption upper limit, the first expected upper limit and the second expected upper limit until the current actual power consumption is lowered such that same does not exceed the first expected upper limit.

The process of lowering and updating the current power consumption upper limit according to the current actual power consumption, the current power consumption upper limit, the first expected upper limit and the second expected upper limit includes:

updating the current power consumption upper limit of the ME according to a lowering formula, the lowering formula including:

$$a_{n+1}=a_n-e_{n+1}, e_{n+1}=s(x_n-a_n)+(1-s)e_n, n=1,2,\ldots;$$

where $x_n$ is the current actual power consumption; $a_n$ is the current power consumption upper limit; $a_1$ is valued as the first expected upper limit; $e_n$ is a current allowable error interval value; $e_1$ is valued as a difference value between the second expected upper limit and the first expected upper limit; and s is a correction coefficient.

It might be understood that the lowering of the power consumption upper limit of the ME is mainly in accordance with a negative feedback of the current actual power consumption, and a method of gradually smooth lowering should be used, whereby difference values between the current power consumption upper limit and the first and second expected upper limit are also considered.

Further, the process of lowering and updating the current power consumption upper limit according to the current actual power consumption, the current power consumption upper limit, the first expected upper limit and the second expected upper limit includes:

updating the current power consumption upper limit of the ME according to a lowering formula, the lowering formula including:

$$a_{n+1}=a_n-e_{n+1}, e_{n+1}=s(x_n-a_n)+(1-s)e_n, n=1,2,\ldots;$$

where $x_n$ is the current actual power consumption; $a_n$ is the current power consumption upper limit; $a_1$ is valued as the first expected upper limit; $e_n$ is a current allowable error interval value; $e_1$ is valued as a difference value between the second expected upper limit and the first expected upper limit; and s is a correction coefficient.

It might be understood that in the previous embodiment, in step S1, it is determined that the current power consumption upper limit of the ME during the first adjustment is the first expected upper limit $a_1$; in step S2, the current actual power consumption $x_1$ of the server during the first adjustment is acquired; $e_1$ is the difference value between the second expected upper limit and the first expected upper limit, and s is a determined correction coefficient; $e_{n+1}$ is first calculated for each adjustment; a power consumption upper limit $a_{n+1}$ used for the next adjustment is then determined, and the current power consumption upper limit is updated; and after the current power consumption upper limit is lowered and updated each time, the current actual power consumption of the server will be acquired again, and the step of determining a next power consumption upper limit using a lowering formula is executed until the current actual power consumption of the server is lowered such that same does not exceed the first expected upper limit.

Further, in order to improve the smoothness in the power consumption limitation process and avoid sudden changes in the actual power consumption, the correction coefficient is usually set within a range of greater than 0.5 and less than 1 during specific setting.

In this embodiment, the effect of power consumption adjustment of an ME is reflected on the actual power consumption of a server, and a power consumption upper limit of the ME is subjected to dynamic negative feedback adjustment by utilizing the actual power consumption, until the actual power consumption is lowered to the first expected upper limit, whereby the power consumption control requirement of the server policy is met.

Embodiment III

Figure 2:
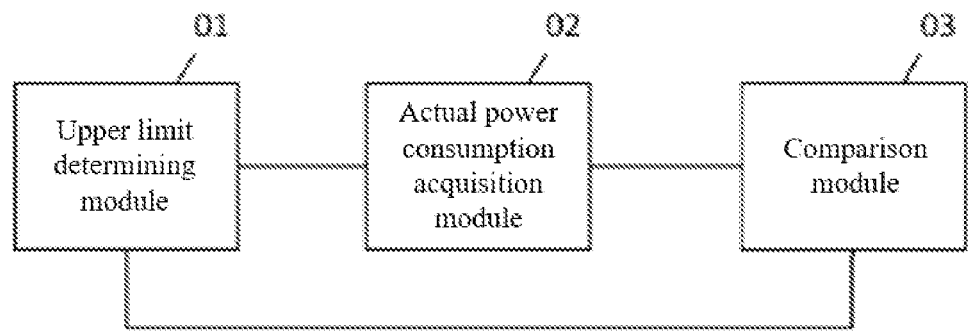
FIG. 2 is a structural distribution diagram of a control system for a power consumption upper limit of a server in an embodiment of the present disclosure.
Figure 3:
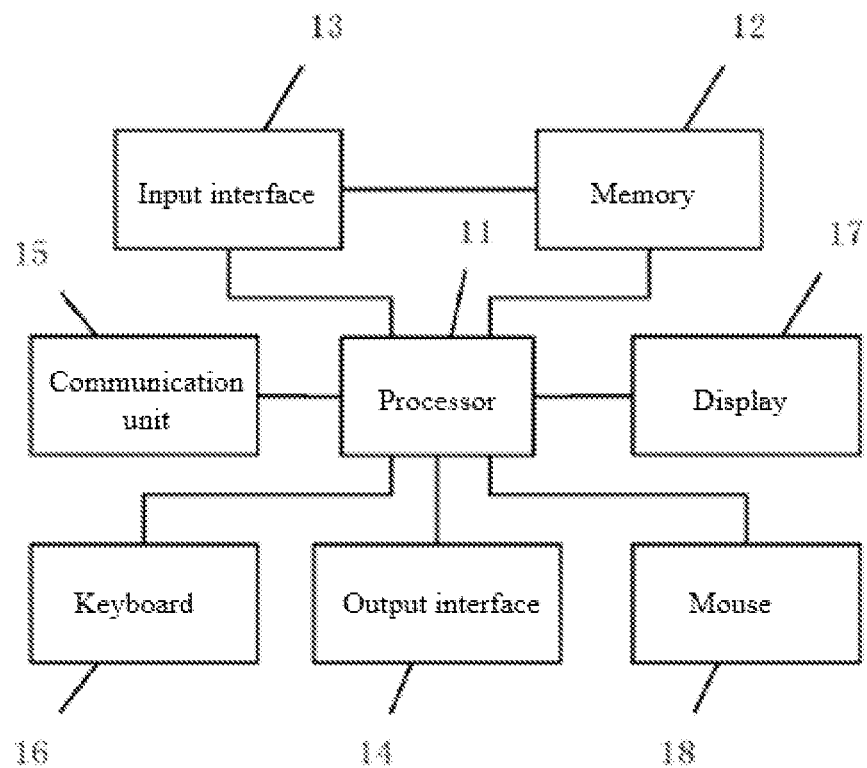
FIG. 3 is a structural distribution diagram of a control device for a power consumption upper limit of a server in an embodiment of the present disclosure.

Correspondingly, an embodiment of the present disclosure further discloses a control system for a power consumption upper limit of a server, referring to FIG. 2, including:
- an upper limit determining module 01, configured to determine, according to a server policy, a power consumption upper limit of an ME to be a first expected upper limit;
- an actual power consumption acquisition module 02, configured to acquire actual power consumption of a server; and
- a comparison module 03, configured to compare the current actual power consumption with the first expected upper limit and a second expected upper limit.

The upper limit determining module 01 is also configured to: if the current actual power consumption is greater than the first expected upper limit and does not exceed the second expected upper limit, lower the current power consumption upper limit until the current actual power consumption is lowered such that same does not exceed the first expected upper limit.

In this embodiment, the effect of power consumption adjustment of an ME is reflected on the actual power consumption of a server, and a power consumption upper limit of the ME is subjected to dynamic negative feedback adjustment by utilizing the actual power consumption, until the actual power consumption is lowered to the first expected upper limit, whereby the power consumption control requirement of the server policy is met.

In some embodiments, the upper limit determining module 01 is configured to:
lower and update the current power consumption upper limit according to the current actual power consumption, the current power consumption upper limit, the first expected upper limit and the second expected upper limit until the current actual power consumption is lowered such that same does not exceed the first expected upper limit.

In some embodiments, the upper limit determining module 01 is configured to:
update the current power consumption upper limit of the ME according to a lowering formula, the lowering formula including:

$$a_{n+1}=a_n-e_{n+1}, e_{n+1}=s(x_n-a_n)+(1-s)e_n, n=1,2,\ldots;$$

where $x_n$ is the current actual power consumption; $a_n$ is the current power consumption upper limit; $a_1$ is valued as the first expected upper limit; $e_n$ is a current allowable error interval value; $e_1$ is valued as a difference value between the second expected upper limit and the first expected upper limit; and s is a correction coefficient.

In some embodiments, the correction coefficient is greater than 0.5.

In some embodiments, the upper limit determining module 01 is also configured to: if the current actual power consumption exceeds the second expected upper limit, determine that power consumption limitation of the ME fails.

In some embodiments, the upper limit determining module 01 is configured to determine, according to the server policy, the power consumption upper limit of the ME to be the first expected upper limit through an IPMI command.

In some embodiments, the upper limit determining module 01 is configured to: if the current actual power consumption is greater than the first expected upper limit and does not exceed the second expected upper limit, lower the current power consumption upper limit through the IPMI command until the current actual power consumption is lowered such that same does not exceed the first expected upper limit.

Embodiment IV

An embodiment of the present application further discloses a control device for a power consumption upper limit of a server, including a processor 11 and a memory 12. When executing a computer program stored in the memory 12, the processor 11 performs the following steps:
determining, according to a server policy, a power consumption upper limit of a management engine (ME) to be a first expected upper limit;
acquiring actual power consumption of a server;
comparing the current actual power consumption with the first expected upper limit and a second expected upper limit; and
if the current actual power consumption is greater than the first expected upper limit and does not exceed the second expected upper limit, lowering the current power consumption upper limit until the current actual power consumption is lowered such that same does not exceed the first expected upper limit.

In this embodiment, the effect of power consumption adjustment of an ME is reflected on the actual power consumption of a server, and a power consumption upper limit of the ME is subjected to dynamic negative feedback adjustment by utilizing the actual power consumption, until the actual power consumption is lowered to the first expected upper limit, whereby the power consumption control requirement of the server policy is met.

In some embodiments, when executing a computer subprogram stored in the memory 12, the processor 11 might perform the following steps:
lowering and updating the current power consumption upper limit according to the current actual power consumption, the current power consumption upper limit, the first expected upper limit and the second expected upper limit until the current actual power consumption is lowered such that same does not exceed the first expected upper limit.

In some embodiments, when executing a computer subprogram stored in the memory 12, the processor 11 might perform the following steps:

update the current power consumption upper limit of the ME according to a lowering formula, the lowering formula including:

$$a_{n+1}=a_n-e_{n+1}, e_{n+1}=s(x_n-a_n)+(1-s)e_n, n=1,2,\ldots;$$

where $x_n$ is the current actual power consumption; $a_n$ is the current power consumption upper limit; $a_1$ is valued as the first expected upper limit; $e_n$ is a current allowable error interval value; $e_1$ is valued as a difference value between the second expected upper limit and the first expected upper limit; and s is a correction coefficient.

In some embodiments, the correction coefficient is greater than 0.5.

In some embodiments, when executing a computer sub-program stored in the memory 12, the processor 11 might perform the following steps:
  if the current actual power consumption exceeds the second expected upper limit, determining that power consumption limitation of the ME fails.

In some embodiments, when executing a computer sub-program stored in the memory 12, the processor 11 might perform the following steps:
  determining, according to the server policy, the power consumption upper limit of the ME to be the first expected upper limit through an intelligent platform management interface (IPMI) command.

In some embodiments, when executing a computer sub-program stored in the memory 12, the processor 11 might perform the following steps:
  if the current actual power consumption is greater than the first expected upper limit and does not exceed the second expected upper limit, lowering the current power consumption upper limit through an IPMI command until the current actual power consumption is lowered such that same does not exceed the first expected upper limit.

Further, the control device for a power consumption upper limit of a server in this embodiment might further include:
  an input interface 13, configured to acquire a computer program imported from the outside and save the acquired computer program in the memory 12, and also configured to acquire various instructions and parameters transmitted by an external terminal device and transmit the instructions and parameters to the processor 11, whereby the processor 11 might carry out corresponding processing using the above instructions and parameters, wherein in this embodiment, the input interface 13 might include but not limited to a USB interface, a serial interface, a voice input interface, a fingerprint input interface, a hard disk reading interface, and the like;
  an output interface 14, configured to output various data generated by the processor 11 to a terminal device connected to the processor, whereby other terminal devices connected to the output interface 14 might acquire the various data generated by the processor 11, wherein in this embodiment, the output interface 14 might include but not limited to a USB interface, a serial interface, and the like;
  a communication unit 15, configured to establish a remote communication connection between the control device for a power consumption upper limit of a server and an external server, whereby the control device for a power consumption upper limit of a server might mount an image file to the external server, wherein in this embodiment, the communication unit 15 might include but is not limited to a remote communication unit based on a wireless communication technology or a wired communication technology;
  a keyboard 16, configured to acquire various parameter data or instructions input by a user tapping on keys in real time;
  a display 17, configured to display information related to the control process for a power consumption upper limit of a server in real time, whereby the user might timely understand the control of the power consumption upper limit of the current server; and
  a mouse 18, configured to assist the user in inputting the data and simplify user's operations.

Embodiment V

Further, an embodiment of the present application further discloses a readable storage medium, which includes a random access memory (RAM), an internal memory, a read-only memory (ROM), an electrically programmable ROM, an electrically erasable programmable ROM, a register, a hard disk, a removable hard disk, a CD-ROM or storage media in any other forms known in the technical field. A computer program is stored on the readable storage medium. The computer program, when executed by a processor, implements the following steps:
  determining, according to a server policy, a power consumption upper limit of a management engine (ME) to be a first expected upper limit;
  acquiring actual power consumption of a server;
  comparing the current actual power consumption with the first expected upper limit and a second expected upper limit; and
  if the current actual power consumption is greater than the first expected upper limit and does not exceed the second expected upper limit, lowering the current power consumption upper limit until the current actual power consumption is lowered such that same does not exceed the first expected upper limit.

In this embodiment, the effect of power consumption adjustment of an ME is reflected on the actual power consumption of a server, and a power consumption upper limit of the ME is subjected to dynamic negative feedback adjustment by utilizing the actual power consumption, until the actual power consumption is lowered to the first expected upper limit, whereby the power consumption control requirement of the server policy is met.

In some embodiments, a computer sub-program stored on the readable storage medium, when executed by a processor, might implement the following step:
  lower and update the current power consumption upper limit according to the current actual power consumption, the current power consumption upper limit, the first expected upper limit and the second expected upper limit until the current actual power consumption is lowered such that same does not exceed the first expected upper limit.

In some embodiments, when executing a computer sub-program stored in a memory 12, a processor 11 might perform the following steps:
  updating the current power consumption upper limit of the ME according to a lowering formula, the lowering formula including:

$$a_{n+1}=a_n-e_{n+1}, e_{n+1}=s(x_n-a_n)+(1-s)e_n, n=1,2,\ldots;$$

where $x_n$ is the current actual power consumption; $a_n$ is the current power consumption upper limit; $a_1$ is valued as the first expected upper limit; $e_n$ is a current allowable error interval value; $e_1$ is valued as a difference value between the second expected upper limit and the first expected upper limit; and s is a correction coefficient.

In some embodiments, the correction coefficient is greater than 0.5.

In some embodiments, a computer sub-program stored on the readable storage medium, when executed by a processor, might implement the following step:

if the current actual power consumption exceeds the second expected upper limit, determining that power consumption limitation of the ME fails.

In some embodiments, a computer sub-program stored on the readable storage medium, when executed by a processor, might implement the following step:

determining, according to the server policy, the power consumption upper limit of the ME to be the first expected upper limit through an intelligent platform management interface (IPMI) command.

In some embodiments, a computer sub-program stored on the readable storage medium, when executed by a processor, might implement the following step:

if the current actual power consumption is greater than the first expected upper limit and does not exceed the second expected upper limit, lowering the current power consumption upper limit through an IPMI command until the current actual power consumption is lowered such that same does not exceed the first expected upper limit.

Finally, it should be noted that those skilled in the art might understand that all or part of the steps in the various methods of the above embodiments might be completed by instructing related hardware through programs that might be stored in a computer-readable storage unit. The storage units described in all the embodiments of the present application include a ROM, a RAM, a magnetic disk or the like.

The terms "include", "including" or any other variants herein are meant to cover non-exclusive inclusions, whereby a process, method, object or device that includes a series of elements not only includes those elements, but also includes other elements which are not definitely listed, or further includes inherent elements of this process, method, object or device. Without more restrictions, elements defined by a sentence "includes a/an . . . " do not exclude that the process, method, object or device that includes the elements still includes other identical elements.

All the embodiments in the specification are described in a progressive manner. Contents mainly described in each embodiment are different from those described in other embodiments. Same or similar parts of all the embodiments refer to each other.

The foregoing description of the disclosed embodiments enables those skilled in the art to implement or use the present application. Various modifications to these embodiments will be apparent to those skilled in the art, and the general principles defined herein might be implemented in other embodiments without departing from the spirit or scope of the present application. Therefore, the present application will not be limited to these embodiments shown in this text, but shall conform to the widest scope consistent with the principles and novel features disclosed herein.

What is claimed is:

1. A control method for a power consumption upper limit of a server, comprising:

determining, according to a server policy, a power consumption upper limit of a management engine (ME) to be a first expected upper limit;

in response to an intelligent platform management interface (IPMI) command, controlling the ME to perform a power consumption limitation on the server according to a first desired upper limit as a current power consumption upper limit of the ME;

acquiring a current actual power consumption of the server;

comparing the current actual power consumption with the first expected upper limit and a second expected upper limit; and in response to the current actual power consumption being greater than the first expected upper limit and not exceeding the second expected upper limit, lowering the current power consumption upper limit of the ME until the current actual power consumption is lowered by the ME such that the current actual power consumption of the server does not exceed the first expected upper limit;

wherein, the lowering the current power consumption upper limit of the ME until the current actual power consumption is lowered by the ME such that the current actual power consumption of the server does not exceed the first expected upper limit comprises:

updating the current power consumption upper limit of the ME according to a lowering formula, the lowering formula comprising:

$$a_{n+1}=a_n-e_{n+1}, e_{n+1}=s(x_n-a_n)+(1-s)e_n, n=1,2,\ldots;$$

wherein $x_n$ refers to the current actual power consumption of the server at an nth lowering; $a_n$ refers to the current power consumption upper limit of the ME at the nth lowering; $a_1$ is set at a value equal to the first expected upper limit; $e_n$ refers to a current allowable error interval value at the nth lowering; $e_1$ is set at a difference value between the second expected upper limit and the first expected upper limit; and s refers to a correction coefficient.

2. The control method according to claim 1, wherein the correction coefficient is greater than 0.5.

3. The control method according to claim 1, further comprising:

in response to the current actual power consumption exceeding the second expected upper limit, determining that the power consumption limitation of the ME fails.

4. The control method according to claim 3, wherein the determining, according to a server policy, a power consumption upper limit of an ME to be a first expected upper limit comprises:

determining, according to the server policy, the power consumption upper limit of the ME to be the first expected upper limit through the IPMI command.

5. The control method according to claim 4, wherein the in response to the current actual power consumption being greater than the first expected upper limit and not exceeding the second expected upper limit, lowering the current power consumption upper limit of the ME until the current actual power consumption is lowered by the ME such that the current actual power consumption of the server does not exceed the first expected upper limit comprises:

in response to the current actual power consumption being greater than the first expected upper limit and not exceeding the second expected upper limit, lowering the current power consumption upper limit through the IPMI command until the current actual power consumption is lowered such that the current actual power consumption does not exceed the first expected upper limit.

6. The control method according to claim 1, wherein the second expected upper limit is a power value less than 105% of the first expected upper limit.

7. A control device for a power consumption upper limit of a server comprising:
   a memory, configured to store a computer program; and
   a processor, configured to execute the computer program, wherein the computer program is configured to cause the processor to perform operations comprising:
      determining, according to a server policy, a power consumption upper limit of a management engine (ME) to be a first expected upper limit;
      in response to an intelligent platform management interface (IPMI) command, controlling the ME to perform a power consumption limitation on the server according to a first desired upper limit as a current power consumption upper limit of the ME;
      acquiring a current actual power consumption of the server;
      comparing the current actual power consumption with the first expected upper limit and a second expected upper limit; and
      in response to the current actual power consumption being greater than the first expected upper limit and not exceeding the second expected upper limit, lowering the current power consumption upper limit of the ME until the current actual power consumption is lowered by the ME such that the current actual power consumption of the server does not exceed the first expected upper limit;
      wherein, the lowering the current power consumption upper limit of the ME until the current actual power consumption is lowered by the ME such that the current actual power consumption of the server does not exceed the first expected upper limit comprises:
         updating the current power consumption upper limit of the ME according to a lowering formula, the lowering formula comprising:

$$a_{n+1}=a_n-e_{n+1}, e_{n+1}=s(x_n-a_n)+(1-s)e_n, n=1,2,\ldots;$$

wherein $x_n$ refers to the current actual power consumption of the server at an nth lowering; $a_n$ refers to the current power consumption upper limit of the ME at the nth lowering; $a_1$ is set at a value equal to the first expected upper limit; $e_n$ refers to a current allowable error interval value at the nth lowering; $e_1$ is set at a difference value between the second expected upper limit and the first expected upper limit; and s refers to a correction coefficient.

8. The control device according to claim 7, wherein the correction coefficient is greater than 0.5.

9. The control device according to claim 7, further comprising:
   in response to the current actual power consumption exceeding the second expected upper limit, determining that the power consumption limitation of the ME fails.

10. The control device according to claim 9, wherein the determining, according to a server policy, a power consumption upper limit of an ME to be a first expected upper limit comprises:
   determining, according to the server policy, the power consumption upper limit of the ME to be the first expected upper limit through the IPMI command.

11. A non-transitory computer-readable storage medium, storing a computer program that is executed executable by a processor, and upon execution by the processor, the computer program is configured to cause the processor to perform operations comprising:
      determining, according to a server policy, a power consumption upper limit of a management engine (ME) to be a first expected upper limit;
      in response to an intelligent platform management interface (IPMI) command, controlling the ME to perform a power consumption limitation on a server according to a first desired upper limit as a current power consumption upper limit of the ME;
      acquiring a current actual power consumption of the server;
      comparing the current actual power consumption with the first expected upper limit and a second expected upper limit; and
      in response to the current actual power consumption being greater than the first expected upper limit and not exceeding the second expected upper limit, lowering the current power consumption upper limit of the ME until the current actual power consumption is lowered by the ME such that the current actual power consumption of the server does not exceed the first expected upper limit;
      wherein, the lowering the current power consumption upper limit of the ME until the current actual power consumption is lowered by the ME such that the current actual power consumption of the server does not exceed the first expected upper limit comprises:
         updating the current power consumption upper limit of the ME according to a lowering formula, the lowering formula comprising:

$$a_{n+1}=a_n-e_{n+1}, e_{n+1}=s(x_n-a_n)+(1-s)e_n, n=1,2,\ldots;$$

wherein $x_n$ refers to the current actual power consumption of the server at an nth lowering; $a_n$ refers to the current power consumption upper limit of the ME at the nth lowering; $a_1$ is set at a value equal to the first expected upper limit; $e_n$ refers to a current allowable error interval value at the nth lowering; ej is set at a difference value between the second expected upper limit and the first expected upper limit; and s refers to a correction coefficient.

12. The non-transitory computer-readable storage medium according to claim 11, wherein the correction coefficient is greater than 0.5.

13. The non-transitory computer-readable storage medium according to claim 11, further comprising:
   in response to the current actual power consumption exceeding the second expected upper limit, determining that the power consumption limitation of the ME fails.

14. The non-transitory computer-readable storage medium according to claim 13, wherein the determining, according to a server policy, a power consumption upper limit of an ME to be a first expected upper limit comprises:
   determining, according to the server policy, the power consumption upper limit of the ME to be the first expected upper limit through the IPMI command.

* * * * *